United States Patent
Choi et al.

(10) Patent No.: US 10,807,232 B2
(45) Date of Patent: Oct. 20, 2020

(54) ARTICULATED ROBOT ACTUATOR

(71) Applicant: ANGEL ROBOTICS Co., Ltd., Seoul (KR)

(72) Inventors: Hyun-Jin Choi, Seongnam-si (KR); Byeong-Hun Na, Seoul (KR)

(73) Assignee: ANGEL ROBOTICS Co., Ltd., Seoul (KR)

( * ) Notice: Subject to any disclaimer, the term of this patent is extended or adjusted under 35 U.S.C. 154(b) by 365 days.

(21) Appl. No.: 15/572,488

(22) PCT Filed: Jun. 7, 2016

(86) PCT No.: PCT/KR2016/005987
§ 371 (c)(1),
(2) Date: Nov. 7, 2017

(87) PCT Pub. No.: WO2016/204441
PCT Pub. Date: Dec. 22, 2016

(65) Prior Publication Data
US 2018/0133894 A1    May 17, 2018

(30) Foreign Application Priority Data
Jun. 15, 2015    (KR) .......................... 10-2015-0083862

(51) Int. Cl.
*B25J 9/06*        (2006.01)
*B25J 9/10*        (2006.01)
*B25J 9/00*        (2006.01)

(52) U.S. Cl.
CPC ............... *B25J 9/06* (2013.01); *B25J 9/0006* (2013.01); *B25J 9/10* (2013.01); *B25J 9/102* (2013.01)

(58) Field of Classification Search
CPC ..... B25J 9/06; B25J 9/0006; B25J 9/10; B25J 9/102; A61H 1/02; A61H 1/0237;
(Continued)

(56) References Cited

U.S. PATENT DOCUMENTS 6,966,882 B2 * 11/2005 Horst ................... A61H 1/0237
                                                                601/33
7,780,616 B2 * 8/2010 Katoh ................... A61F 5/0102
                                                                601/33
(Continued)

FOREIGN PATENT DOCUMENTS

JP    2007-090490 A    4/2007
JP        4758119 B2    8/2011
(Continued)

OTHER PUBLICATIONS

Na, Byeonghun et al, Impedance Compensation of Lower Extremity Assistive Device with Compact Series Elastic Actuators, 2011 (Year: 2011).*

(Continued)

*Primary Examiner* — Rachel T Sippel
*Assistant Examiner* — Benjamin M. Kusiak
(74) *Attorney, Agent, or Firm* — Park, Kim & Suh, LLC

(57) ABSTRACT

An articulated robot actuator includes a pair of motors, a pair of first gear parts, a pair of spring members, a pair of second gear parts, and a pair of joint actuating members, to actuate a plurality of joints of an articulated robot. The pair of motors have rotary shafts arranged in parallel, and the pair of first gear parts change directions of rotational actuation forces from the motors. The pair of spring members have degrees of torsion strains determined by the rotational actuation forces from the first gear parts, and the pair of second gear parts receive the rotational actuation forces transferred thereto according to the degrees of the torsion strains of the spring members. The pair of joint actuating members are rotated about a common rotary shaft by the rotational actuation forces from the second gear parts.

13 Claims, 7 Drawing Sheets

(58) Field of Classification Search
CPC .... A61H 1/024; A61H 1/0244; A61H 1/0255; A61H 1/0262; A61H 2001/0211; A61H 2201/1207; A61H 2201/1215; A61H 2201/1463; A61H 2203/0406; A61H 3/00; A61H 2003/007
USPC .......................................................... 601/33
See application file for complete search history.

(56) References Cited

U.S. PATENT DOCUMENTS

| | | | | |
|---|---|---|---|---|
| 8,920,060 | B2* | 12/2014 | Maekita | G05G 5/04 403/117 |
| 2006/0276728 | A1* | 12/2006 | Ashihara | A61F 5/0102 601/5 |
| 2014/0276261 | A1* | 9/2014 | Caires | A61H 1/024 601/33 |
| 2016/0193102 | A1* | 7/2016 | Roh | A61H 1/0244 623/27 |
| 2018/0325765 | A1* | 11/2018 | Wilmington | A61H 1/024 |
| 2019/0262214 | A1* | 8/2019 | Smith | A61H 3/00 |

FOREIGN PATENT DOCUMENTS

| | | | | |
|---|---|---|---|---|
| KR | 10-1999-0039799 | A | 6/1999 | |
| KR | 20090076824 | A * | 7/2009 | ........... F16H 63/304 |
| KR | 10-2013-0017379 | A | 2/2013 | |
| KR | 10-1469493 | B1 | 12/2014 | |

OTHER PUBLICATIONS

International Search Report in International Application No. PCT/KR2016/005987, dated Aug. 31, 2016.

* cited by examiner

ARTICULATED ROBOT ACTUATOR

CROSS-REFERENCE TO RELATED APPLICATIONS

This application is the National Stage filing under 35 U.S.C. 371 of International Application No. PCT/KR2016/005987, filed on Jun. 7, 2016, which claims the benefit of Korean Patent Application No. 10-2015-0083862, filed on Jun. 15, 2015, the contents of which are all hereby incorporated by reference herein in their entirety.

TECHNICAL FIELD

The present invention relates to an articulated robot actuator. More specifically, the present invention relates to an articulated robot actuator capable of minimizing the volume and weight thereof, securing flexibility to avoid mechanical friction, and complexly actuating a plurality of joints of an articulated robot having a multi-joint muscle structure to enable a natural movement.

BACKGROUND ART

Robots are machines which are capable of automatically processing a work assigned thereto or operating using its own capabilities and have recently been used in various fields.

Among the robots, a robot having a moving function, a robot supporting a movement of a user's body when the user wears it, etc. have been variously introduced.

Examples of the robot having a moving function include robots having a moving function using a conventional wheel driving method. However, these robots are limited by road conditions. Recently, robots having a multi-joint skeleton structure have been studied and introduced for national defense, relief purposes, or industrial purposes.

Furthermore, in the case of robots having a multi-joint skeleton structure, research has been conducted on robots capable of supporting a human movement when the human wears it.

For example, research has been conducted on robots capable of supporting independent walks of old people, patients, or disabled people with low walking ability or improving physical walking speeds thereof.

In order to realize a walking operation of each robot having a multi-joint skeleton structure which is similar to a human movement or an animal's movement, links connecting joints of each robot when the joints are actuated should be controlled to be actuated similar to the movement of a calf or thigh of a human body or an animal's body.

However, when rotational torque needed for walking is generated by mounting an actuator on each joint, counter torque is applied to a joint adjacent to each joint and thus an awkward and exaggerated movement which is different from a human body's walking or an animal's walking is generated. That is, a natural movement of a multi-leg moving robot or a wearable robot cannot be achieved by simply actuating the actuator mounted on each joint to generate a desired rotational torque and rotatably actuate each joint.

Furthermore, when the actuator is mounted on each joint part, the weight and volume of each joint part increase. Thus, the consumption of power supplied from, for example, a battery increases and electric wiring connecting joints is complicated.

In addition, research has been conducted on an articulated leg-supporting robot capable of supporting a movement of a malfunctioning leg as an example of a wearable articulated supporting robot.

The articulated leg-supporting robot is a robot which provides joint torque to support weak legs of the disabled, the wounded, or the elderly when walking erect so that they can walk like normal people.

The leg-supporting robot is designed for a user to wear and thus an electrical motor for use therein is required to be manufactured in a small size to reduce the weight and volume thereof. Furthermore, a speed reducer is used in the electric motor to secure output torque. However, when the speed reducer is used in the electric motor, the output torque of the electric motor increases according to a gear ratio but a degree of mechanical friction that a user may feel is not low due to a friction force generated when a plurality of gears are rotated while being engaged with each other. Due to the mechanical force occurring due to the plurality of gears, the user would feel the sense of irritation and discomfort when the user wears the leg-supporting robot.

When the leg-supporting robot is used, a joint actuation force is provided from torque supplied by the electric motor when walking erect but a user who wants to move a joint slightly or change his or her posture would feel, from the leg-supporting robot, a high friction force interrupting the movement of the joint according to the user's intention when the actuation force is not needed.

Thus, the leg-supporting robot should be actuated according to a situation of a user thereof and the mechanical friction of the leg-supporting robot should be reduced to guarantee the user's flexible movement. However, although providing a sufficient joint actuation force and reducing the mechanical friction to secure the user's flexible movement are contrary to each other in terms of purpose or function, there should be a trade-off between them.

Accordingly, an articulated robot actuator capable of minimizing the volume and weight thereof, securing flexibility to avoid mechanical friction, and complexly actuating a plurality of joints of an articulated robot to enable a natural movement.

DETAILED DESCRIPTION OF THE INVENTION

Technical Problem

The present invention is directed to an articulated robot actuator capable of minimizing the volume and weight thereof, securing flexibility to avoid mechanical friction, and complexly actuating a plurality of joints of an articulated robot having a multi-joint muscle structure to enable a natural movement.

Technical Solution

According to an aspect of the present invention, there is provided an articulated robot actuator comprising a pair of motors of which rotary shafts are arranged in parallel with each other; a pair of first gear parts configured to change directions of rotational actuation forces from the pair of motors, reduce speeds of the rotational actuation forces, and provide the rotational actuation forces; a pair of spring members of which a degree of torsion strain is determined by the actuation forces provided from the pair of first gear parts; a pair of second gear parts configured to actuate joints to be actuated when the rotational actuation forces are transferred thereto according to the degree of torsion strain of the pair of spring members; and a pair of joint actuating members configured to be rotatably actuated about the same rotary shaft by a turning force applied by the pair of second gear parts, and rotatably actuate the plurality of joints of the articulated robot to be actuated.

And the plurality of joints to be actuated may comprise a first joint directly coupled to the pair of joint actuating members; and a second joint spaced apart from the first joint, and coupled to the pair of joint actuating member via a link member.

And the second joint may be rotatably actuated by rotational actuation of at least one of the pair of joint actuating members.

And each of the pair of second gear parts may comprise one of spur gears configured to be independently rotatably actuated about parallel rotary shafts, and the pair of joint actuating members are stacked in the form of a rotary plate independently rotatably actuated about one drive shaft parallel to rotary shafts of the pair of spur gears by the spur gears of the pair of second gear parts.

And the spur gears of the pair of second gear parts may be mounted on different positions on a pair of parallel rotary shafts to transfer the rotational actuation forces to the pair of joint actuating members.

And each of the pair of first gear parts may comprise one of a pair of worm gears being respectively mounted on the rotary shafts of the pair of motors; and one of a pair of worm wheel gears engaged with the pair of worm gears, the pair of worm wheel gears having a drive shaft perpendicular to the rotary shafts of the pair of motors, wherein the motors and the worm gears of the pair of first gear parts are hinge-coupled to a housing of the articulated robot actuator to be rotatable about a location on the housing to which they are hinge-coupled, such that the worm gears are rotated toward the pair of worm wheel gears to be engaged with the pair of worm wheel gears or are rotated away from the pair of worm wheel gears to be disengaged from the pair of worm wheel gears.

And the degree of torsion strain of the spring members caused by rotation of at least one of the pair of joint actuating members may be canceled by the motors.

And the articulated robot may be a leg-supporting robot configured to be attachable to and detachable from a user's body to support the user's walking, the first joint may be provided to support the user's hip joint, and the second joint may be provided to support the user's knee joint.

And the pair of joint actuating members may be rotated in the same direction or different directions or only of the pair of joint actuating members may be rotated according to the user's gait cycle.

And when the pair of joint actuating members are rotated together, the first joint and the second joint may be rotatably actuated in the same direction or different directions or rotation of one of the first and second joints is stopped.

And in the stance phase and in the swing phase of the user's gait cycle, the joint actuating members may be rotatably actuated to rotate the first and second joints of the user's leg in the same direction or different directions or to rotate only one of the first and second joints.

Advantageous Effects

With an articulated robot actuator according to the present invention, a plurality of joints of a robot having a joint structure and a skeleton structure imitating a multi-joint muscle skeleton structure and a joint structure of a body may be complexly actuated to achieve a natural movement.

In the articulated robot actuator according to the present invention, an elastic body is applied between a plurality of gears of an articulated robot actuator to transfer an actuation force from a motor via the elastic body. Thus, mechanical friction may be artificially controlled to be reduced or adjusted when compared to a conventional power transfer method using engagement of gears.

Furthermore, the articulated robot actuator according to the present invention for actuating a plurality of joints may be manufactured in one assembly to minimize the volume and weight thereof.

In addition, in the articulated robot actuator according to the present invention, gear parts may be selectively engaged with each other and thus a degree of freedom of a user's movement may be increased even when the articulated robot actuator is applied to a wearable support robot.

MODE FOR INVENTION

Figure 1:
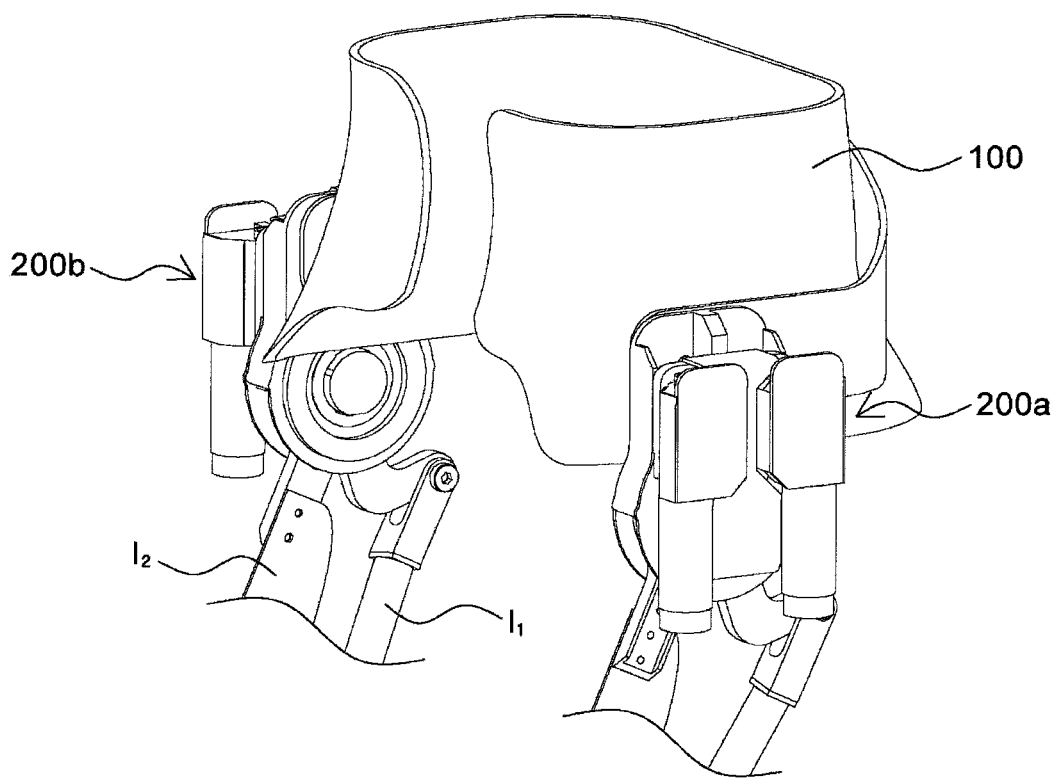
FIG. 1 is a perspective view of some regions of a leg-supporting robot which is an example of a wearable articulated robot having mounted thereon an articulated robot actuator according to an embodiment of the present invention.

Hereinafter, exemplary embodiments of the present invention will be described in detail with reference to the accompanying drawings. However, the present invention is not limited thereto and may be embodied in many different forms. Rather, the embodiments set forth herein are provided so that this disclosure will be thorough and complete and will fully convey the concept of the present invention to those of ordinary skill in the art. The same reference numerals represent the same elements throughout the drawings.

Figure 2:
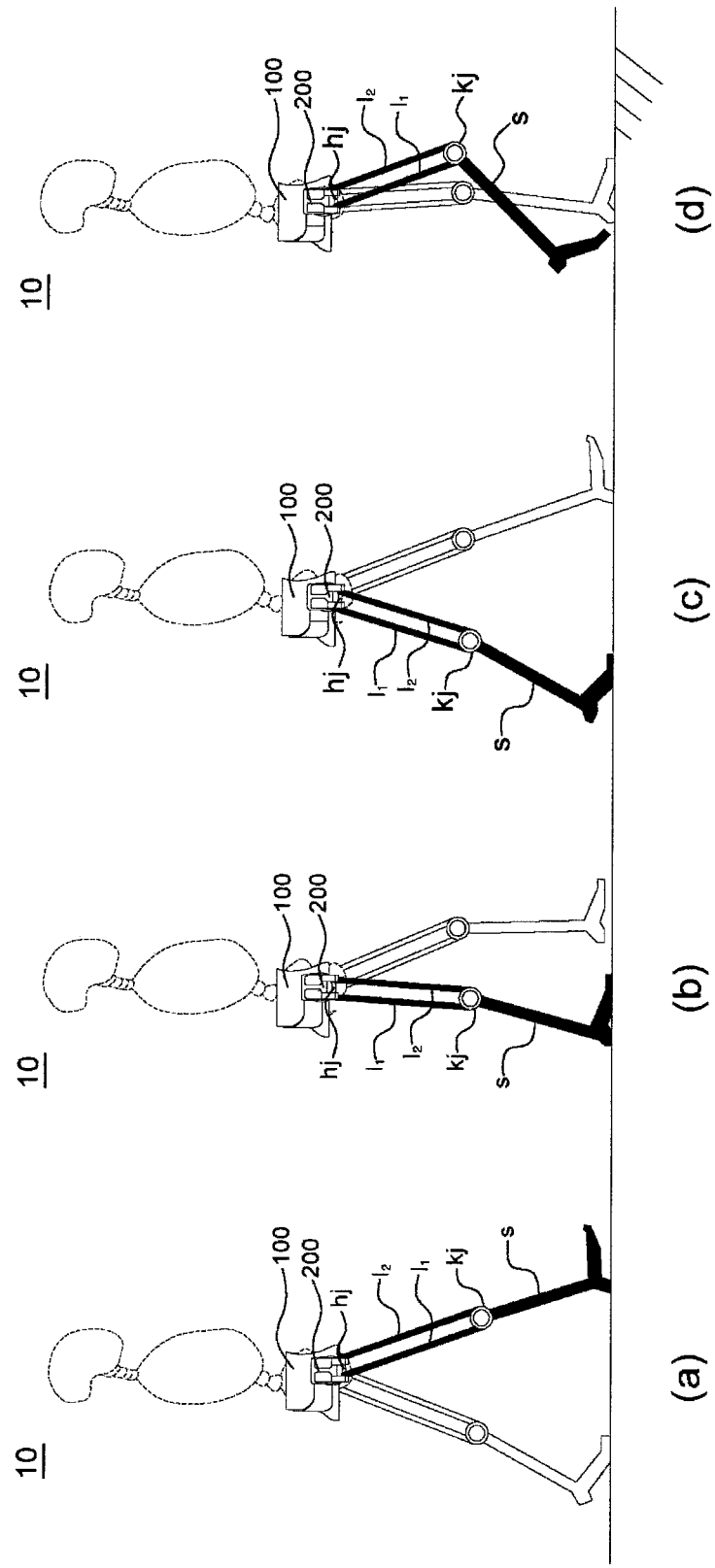
FIG. 2 briefly illustrates a movement of legs of a user who wears a wearable articulated robot having mounted thereon an articulated robot actuator according to an embodiment of the present invention.

FIG. 1 is a perspective view of some regions of a leg-supporting robot which is an example of a wearable articulated robot having mounted thereon an articulated robot actuator according to an embodiment of the present invention. FIG. 2 briefly illustrates a movement of legs of a user who wears a wearable articulated robot having mounted thereon an articulated robot actuator according to an embodiment of the present invention.

An articulated robot actuator 200 according to an embodiment of the present invention is an actuator configured to actuate an arm or leg unit having at least two joints.

When an articulated robot 10 is operated by mounting the articulated robot actuator 200 on each of joints hj and kj of the articulated robot 10 and generating torque required for each of the joints hj and kj according to a load applied or an operating condition, the whole articulated robot 10's movement may not be natural due to counter torque applied to joints adjacent to the joints.

Thus, the articulated robot 10 to which the articulated robot actuator 200 according to the present invention is applied may imitate a multi-joint muscle structure of a human body or an animal and thus employ a skeleton structure and a structure including the joints to achieve a natural movement similar to a movement of the human body or the animal. A multi-joint muscle is a specific muscle coupled to multiple joints, e.g., the joints such that the joints are rotated when the specific muscle contracts and becomes relaxed. Representative examples thereof include a biceps femoris muscle, a quadriceps femoris muscle, etc.

That is, when the skeleton structure or the structure including the joints hj and kj is configured by imitating the multi-joint muscle structure, the articulated robot actuator 200 may be mounted on a location, e.g., an upper body, which is spaced apart from the joints and the joints may be complexly actuated through link members 11 and 12 without directly mounting the articulated robot actuator 200 on the joints. Thus, when compared to a conventional articulated robot 10 which directly applies rotational torque to one joint hj or kj using only the articulated robot actuator 200 mounted on each of the joints hj and kj, counter torque may be dispersed to the articulated robot actuator 200 spaced apart from the joints to prevent an unnatural movement, and the joints hj and kj may be minimized in size and need not be electrically connected to each other, thereby simplifying the structure of the articulated robot actuator 200.

In the case of the leg-supporting robot 10 described above with reference to FIGS. 1 and 2, a user may wear a body 100 of the articulated robot 10 around his or her waist, and his or her left hip and knee joints and right hip and knee joints may be actuated using two actuators 200a and 200b.

That is, the user's left leg may be actuated using the left actuator 200a, and the user's right left may be actuated using the right actuator 200b. Furthermore, the hip joint and the knee joint of each of the left and right legs should be actuated complexly. Thus, the actuators 200 should complexly actuate the hip and knee joints according to a multi-joint muscle method so as to support a body's natural walking.

Here, the complexly actuating of the hip and knee joints may be understood to mean that one of motors 210a and 210b may be used to actuate one of the joints hj and kj and the joints hj and kj are actuated by two motors 210a and 210b and the link members 11 and 12 to which actuation forces from the motors 210a and 210b are transferred.

Various changes may be made in the skeleton structure and a method of actuating the skeleton structure. Thus, the skeleton structure and the method of actuating the skeleton structure will not be described here in detail.

As will be described below, the actuators 200a and 200b may respectively include the two motors 210a and 210b. At least one of the motors 210a and 210b may transmit a rotational actuation force to the joints hj and kj spaced apart therefrom via the link members 11 and 12.

Thus, an effect of dispersing counter torque to an upper body of a user of the leg-supporting robot 10 may be achieved, compared to when the actuators 200a and 200b are respectively mounted on the joints hj and kj. Accordingly, a counter reaction of the movement of the hip joints or knee joints of the legs may be minimized.

Furthermore, when the actuators 200a and 200b capable of complexly activating the two joints hj and kj of each of the left and right legs are mounted around a waist of a user of the leg-supporting robot 10, an operation of the leg-supporting robot 10 is not influenced even when a skeleton structure below the user's waist is exposed to water, and additionally, the weights of leg units may be reduced.

Figure 3:
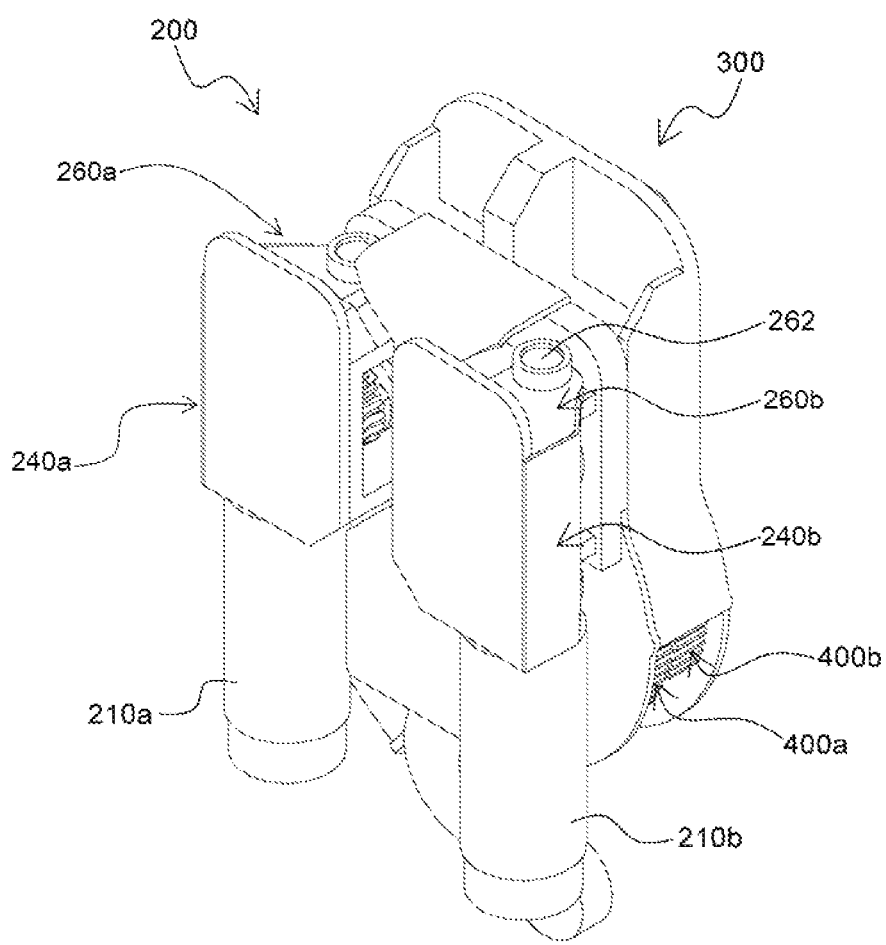
FIG. 3 is a perspective view of an articulated robot actuator according to an embodiment of the present invention.
Figure 4A:
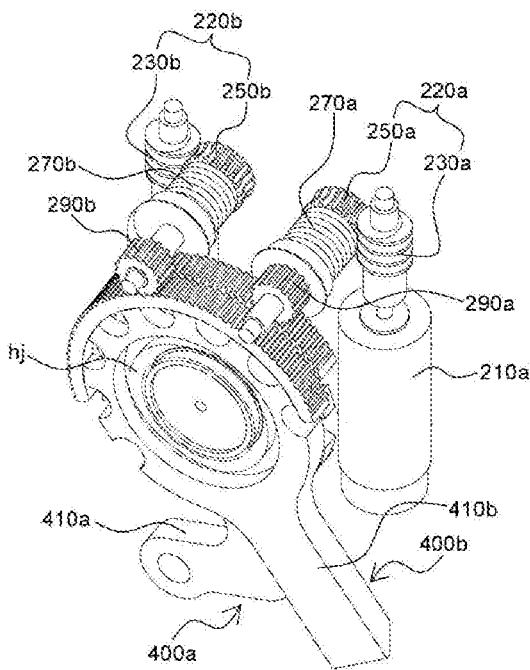
FIG. 4A and FIG. 4B illustrate an internal operating state of an articulated robot actuator according to an embodiment of the present invention.
Figure 4B:
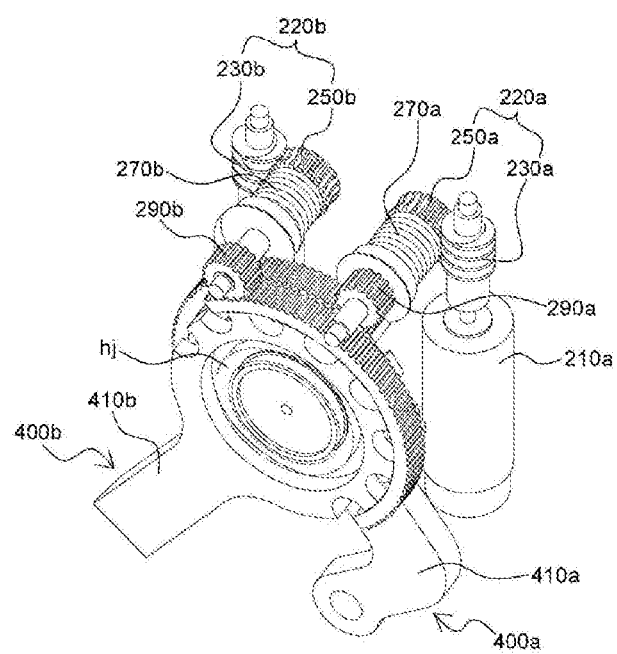

FIG. 3 is a perspective view of an articulated robot actuator 200 according to an embodiment of the present invention. FIG. 4A and FIG. 4B illustrates an internal operating state of the articulated robot actuator 200 according to an embodiment of the present invention.

The articulated robot actuator 200 designed to be simultaneously involved with movements of a plurality of joints will be described below.

The articulated robot actuator 200 according to the present invention may include a pair of motors 210a and 210b of which the rotary shafts are parallel to each other, a pair of first gear parts 220a and 220b configured to change directions of rotational actuation forces provided from the pair of motors 210a and 210b, reduce speeds thereof to increase the rotational actuation forces, and provide the rotational actuation forces, a pair of spring members 270a and 270b of which a degree of torsion strain is determined by the actuation forces provided from the pair of first gear parts 220a and 220b, a pair of second gear parts configured to be rotated according to the degree of torsion strain of the pair of spring members 270a and 270b, and a pair of joint actuating members 400a and 400b configured to be rotatably driven about the same rotary shaft by a turning force transferred by the pair of second gear parts.

The articulated robot actuator 200 may include the motors 210a and 210b to provide a rotational actuation force of the joints hj and kj during walking of a user of the articulated robot 10 having mounted thereon the articulated robot actuator 200.

The articulated robot actuator 200 according to an embodiment of the present invention is provided to actuate the first joint hj and the second joint kj corresponding to a plurality of joints, e.g., a hip joint and a knee joint, when mounted on the articulated robot 10.

Accordingly, the pair of motors 210a and 210b may be provided and thus the rotation of the joints hj and kj to be actuated may be controlled using rotational actuation forces from the motors 210a and 210b. The rotation of the joints hj and kj to be actuated by the rotational actuation forces from the pair of motors 210a and 210b will be described in detail below.

In detail, the pair of motors 210a and 210b may be coupled to the pair of first gear parts 220a and 220b, and may rotate the first gear parts 220a and 220b by providing rotational actuation forces thereto.

As described above, a pair of articulated robot actuators 200 according to an embodiment of the present invention may be provided to supply rotational actuation forces for actuating the first joint hj and the second joint kj corresponding to the hip joint and the knee joint. The pair of motors 210a and 210b may be mounted such that the rotary shafts thereof are parallel to each other.

When the pair of motors 210a and 210b are not provided on parallel rotary shafts and are provided perpendicular to each other or provided at oblique angles, a path of movement of rotational actuation forces from the pair of motors 210a and 210b to final output sides to which the rotational actuation forces, i.e., to the joint actuating members 400a and 400b according to the present invention, among the components of the articulated robot actuator 200 may interfere with each other. Thus, the design of the articulated robot actuator 200 may be complicated, and the rotary shafts of the motors 210a and 210b, i.e., long shafts of the motors 210a and 210b, may be arranged toward an outer side of the articulated robot actuator 200. Accordingly, the volume of the articulated robot actuator 200 may be increased and thus the motors 210a and 210b are preferably arranged such that the rotary shafts thereof are parallel to each other.

In order to change directions of the rotational actuation forces from the pair of motors 210a and 210b, reduce speeds of the rotational actuation forces, and provide the rotational actuation forces, the pair of first gear parts 220a and 220b may include a pair of worm gears 230a and 230b respectively mounted on the rotary shafts of the pair of motors 210a and 210b, and a pair of worm wheel gears 250a and 250b engaged with the pair of worm gears 230a and 230b and having a drive shaft perpendicular to the rotary shafts of the motors 210a and 210b.

Since the pair of worm gears 230a and 230b may be respectively mounted on the rotary shafts of the pair of motors 210a and 210b, the rotary shafts extending from the long shafts of the motors 210a and 210b engaged to the worm gears 230a and 230b may be long. Accordingly, as described above, the pair of motors 210a and 210b may be arranged on parallel rotary shafts and thus rotary shafts of the pair of worm gears 230a and 230b may be parallel to each other, thereby preventing interference between the rotations of the pair of worm gears 230a and 230b.

The pair of worm wheel gears 250a and 250b may be engaged with the pair of worm gears 230a and 230b to have a drive shaft perpendicular to the rotary shafts of the pair of worm gears 230a and 230b engaged therewith, i.e., the rotary shafts of the pair of motors 210a and 210b. The directions of the rotational actuation forces from the motors 210a and 210b may be changed due to a rotational mechanism between the worm gears 230a and 230b and the worm wheel gears 250a and 250b which are engaged in a perpendicular direction.

An engagement structure of the vertical drive shafts of the worm gears 230a and 230b and the worm wheel gears 250a and 250b of the first gear parts 220a and 220b may contribute to minimizing the volume of the articulated robot actuator 200. If a path of movement of rotational actuation forces from the motors 210a and 210b ranges from the worm gears 230a and 230b to the worm wheel gears 250a and 250b having the same rotational shafts as those of the motors 210a and 210b, a long shaft of the articulated robot actuator 200 may increase and thus the volume of the articulated robot actuator 200 may increase. Thus, according to the present invention, the engagement structure of the vertical drive shafts of the worm gears 230a and 230b and the worm wheel gears 250a and 250b is employed and thus a path of movement of rotational actuation forces is prevented from increasing in one direction, thereby preventing a decrease in device arrangement efficiency.

Furthermore, the engagement structure of the vertical drive shafts of the worm gears 230a and 230b and the worm wheel gears 250a and 250b of the first gear parts 220a and 220b may be a structure configured to decrease the speed of rotational actuation forces from the pair of motors 210a and 210b.

The rotational actuation forces from the motors 210a and 210b may vary according to various conditions, such as the types of the motors 210a and 210b, a power source which may be coupled to the motors 210a and 210b, etc. Thus, the first gear parts 220a and 220b may be designed at an appropriate deceleration ratio, in consideration of a device on which the articulated robot actuator 200 is mounted and a user of the device. A deceleration ratio of the worm gears 230a and 230b and the worm wheel gears 250a and 250b of the first gear parts 220a and 220b may vary according to the above various conditions, the device, and the user. For example, the deceleration ratio may be 20:1.

Due to a speed-reduction mechanism of the first gear parts 220a and 220b, the rotational actuation forces from the motors 210a and 210b may be decreased by a speed of rotation of the worm gears 230a and 230b, and output actuation forces of the motors 210a and 210b may be increased.

The worm wheel gears 250a and 250b of the pair of first gear parts 220a and 220b may be respectively coupled to one ends of the spring members 270a and 270b. The pair of second gear parts may be respectively coupled to lower ends of the pair of spring members 270a and 270b.

The pair of spring members 270a and 270b may be torsionally deformed by the rotation of the pair of worm wheel gears 250a and 250b to which rotational actuation forces are transferred from the pair of motors 210a and 210b.

Here, the pair of spring members 270a and 270b have the same rotary shafts as the worm wheel gears 250a and 250b and thus upper and lower parts thereof are torsionally deformed with respect to the same rotary shaft as those of the worm wheel gears 250a and 250b, i.e., the long shafts of the spring members 270a and 270b. A restoring force may be generated due to the torsional deformation of the spring members 270a and 270b, and transferred to the second gear parts to rotate the second gear parts.

That is, the spring members 270a and 270b may be torsionally deformed by the rotation of the worm wheel gears 250a and 250b of the first gear parts 220a and 220b, and rotational actuation forces transferred from the worm wheel gears 250a and 250b through the transfer of a restoring force using the torsional deformation of the spring members 270a and 270b may be transferred to the second gear parts.

The rotary shafts of the worm wheel gears 250a and 250b of which the direction of the rotary shafts are changed by the worm gears 230a and 230b of the first gear parts 220a and 220b may be shared by the spring members 270a and 270b and the second gear parts. Thus, the same rotary shafts of the worm wheel gears 250a and 250b, the spring members 270a and 270b, and the second gear parts may be a path of movement of the rotational actuation forces from the motors 210a and 210b.

As described above, the pair of spring members 270a and 270b are located between the pair of worm wheel gears 250a and 250b of the pair of first gear parts 220a and 220b and the second gear parts and are thus a path of movement of a turning force from the worm wheel gears 250a and 250b to the second gear parts. Thus, a mechanical frictional force may be minimized when a rotational actuation force is transferred when compared to a conventional rotary-shaft path in which a rotational actuation force is generated only through engagement of gears.

That is, the first gear parts 220a and 220b and the second gear parts are not directly engaged with each other, and are coupled to each other via the spring members 270a and 270b configured to transfer rotational actuation forces when transformed and restored. Thus, a mechanical frictional force caused by engagement and rotation of gears may be reduced.

The pair of second gear parts configured to actuate the joints hj and kj to be actuated when rotational actuation forces are transferred thereto according to the degree of torsion strain of the pair of spring members 270a and 270b may respectively include spur gears 290a and 290b configured to be individually rotationally driven about parallel rotary shafts.

A drive shaft of the pair of spur gears 290a and 290b of the pair of second gear parts is aligned with the rotary shafts of the worm wheel gears 250a and 250b of the first gear parts 220a and 220b and the second gear parts. Thus, a rotational actuation force which is proportional to the degree of torsion strain of the spring members 270a and 270b may be transferred to the spur gears 290a and 290b. Since the pair of motors 210a and 210b are provided on parallel rotary shafts and the pair of first gear parts 220a and 220b and the pair of spring members 270a and 270b forming a path of movement of rotational actuation forces from the pair of motors 210a and 210b are parallel to each other, the spur gears 290a and 290b of the pair of second gear parts may be also provided with respect to parallel rotary shafts.

The pair of joint actuating members 400a and 400b may be stacked in the form of a rotary plate independently rotatably driven about one drive shaft parallel to the pair of rotary shafts by the spur gears 290a and 290b of the pair of second gear parts.

Since the pair of joint actuating members 400a and 400b share the same rotary shaft, only a minimum rotary shaft region of the articulated robot actuator 200 may be used. If the pair of joint actuating members 400a and 400b do not share the same rotary shaft and are rotatably driven about different rotary shafts, rotary shafts on the articulated robot actuator 200 about which the pair of joint actuating members 400a and 400b are rotated are located at different positions. Accordingly, the volume of the articulated robot actuator 200 may be increased.

Furthermore, due to the above problem, the pair of motors 210a and 210b and the plurality of gears operated to rotatably actuate a pair of articulated robot actuators 200 may be also provided on a drive shaft having a complicated structure and different locations, and thus a big problem may occur in entire device design.

Thus, it is preferable that the pair of joint actuating members 400a and 400b be provided to share the same rotary shaft and the sizes thereof be the same. A bearing may be provided between the pair of joint actuating members 400a and 400b for smooth and independent rotation of the pair of joint actuating members 400a and 400b.

The pair of joint actuating members 400a and 400b may be independently actuated by rotational actuation forces supplied from the pair of motors 210a and 210b. To this end, the first gear part 220a, the spring member 270a, and the second gear part 290a coupled to the motor 210a of the pair of motors 210a and 210b may be coupled to the joint actuating member 400a of the pair of joint actuating members 400a and 400b. The first gear part 220b, the spring member 270b, and the second gear part 290b coupled to the other motor 210b of the pair of motors 210a and 210b may be coupled to the other joint actuating member 400a of the pair of joint actuating members 400a and 400b.

Accordingly, the pair of joint actuating members 400a and 400b are provided with different rotational actuation forces from the different motors 210a and 210b via different paths, and thus the rotatable actuation thereof may be individually controlled to complexly actuate joints.

Here, components forming a path of movement of rotational actuation forces to the pair of joint actuating members 400a and 400b, i.e., the pair of motors 210a and 210b, the pair of first gear parts 220a and 220b, the pair of spring members 270a and 270b, and the pair of second gear parts, may be provided on one side surfaces of the pair of joint actuating members 400a and 400b. Thus, the articulated robot actuator 200 may be minimized in volume and the design thereof may be simplified.

The pair of joint actuating members 400a and 400b may be rotatably driven by the rotation of the pair of spur gears 290a and 290b of the pair of second gear parts, and may rotatably actuate one joint hj which is to be actuated and which may be configured to share the same rotary shaft as the pair of joint actuating members 400a and 400b and another joint kj which is to be actuated and which is coupled to the pair of joint actuating members 400a and 400b. Thus, the joints hj and kj which are different joints to be actuated may be actuated using one articulated robot actuator 200, as will be described in detail below.

As described above, the articulated robot actuator 200 according to the present invention may include the pair of joint actuating members 400a and 400b such that each of the joint actuating members 400a and 400b contributes to rotation of the joints hj and kj, and may include the motors 210a and 210b, the first gear parts 220a and 220b, the spring members 270a and 270b, and the second gear parts coupled to the pair of joint actuating members 400a and 400b so as to independently actuate the pair of joint actuating members 400a and 400b.

The articulated robot 10 on which the articulated robot actuator 200 is mounted may be a leg-supporting robot 10 configured to be attachable to and detachable from a user's body to support the user's walking.

The articulated robot actuator 200 according to the present invention is not limited to being mounted on the leg-supporting robot 10, and the type thereof is not limited, provided it is capable of supporting the movements of the joints hj and kj to support movement of a user's body. However, for brevity and clarity, the articulated robot actuator 200 may be hereinafter described as the actuator 200 applicable to the leg-supporting robot 10.

The components of the articulated robot actuator 200 according to the present invention which are capable of providing a path of movement of a rotational actuation force, e.g., the pair of motors 210a and 210b and the joint actuating members 400a and 400b, have been briefly described above. The structures of these components and a connection therebetween will be described in more detail below.

Figure 5:
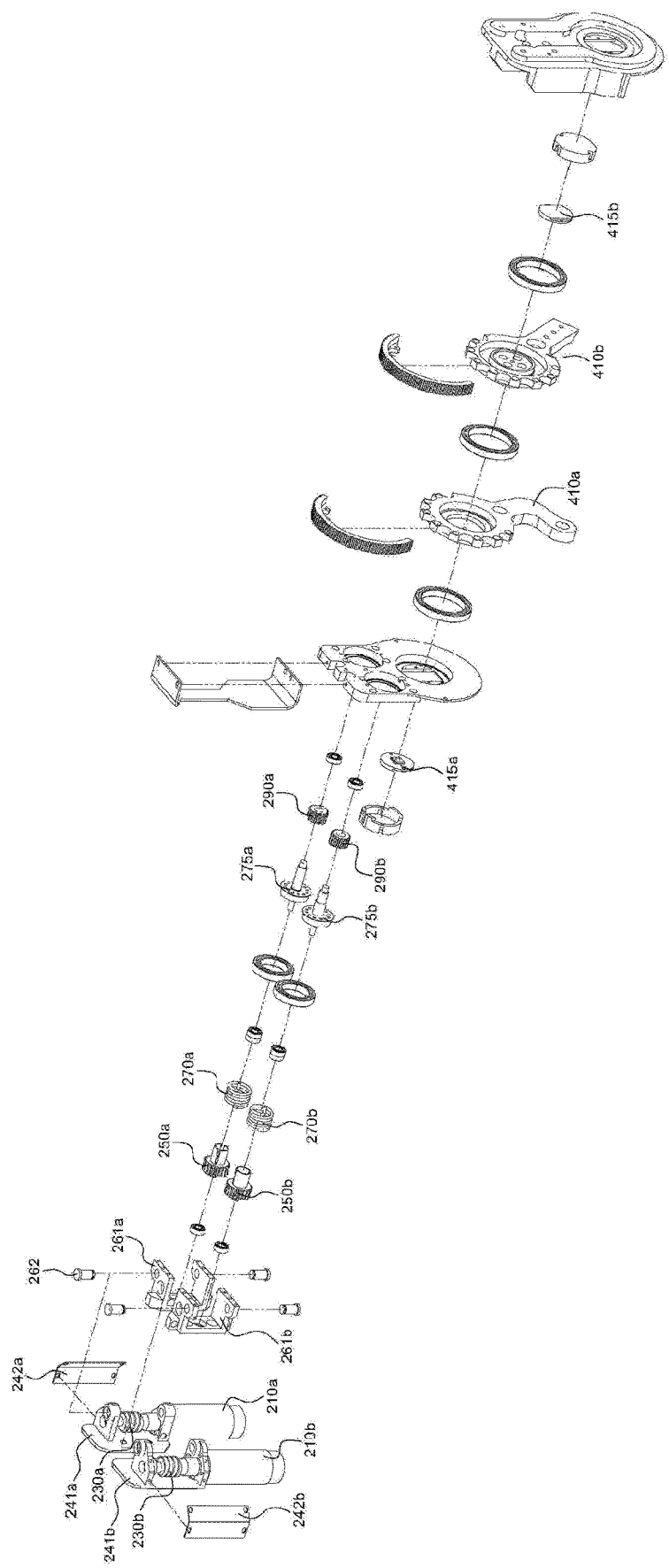
FIG. 5 is an exploded perspective view of an articulated robot actuator according to an embodiment of the present invention.

FIG. 5 is an exploded perspective view of an articulated robot actuator according to an embodiment of the present invention.

Components of the articulated robot actuator 200 and a connection therebetween which will be described in detail below may be one embodiment based on the structures, operations, and effects of the pair of motors 210a and 210b, the pair of first gear parts 220a and 220b, the pair of spring members 270a and 270b, the pair of second gear parts, and the pair of joint actuating members 400a and 400b of the articulated robot 10 which may form a path of movement of a rotational actuation force as described above. That is, the articulated robot actuator 200 according to the present invention may be differently configured according to various embodiments without departing from the scope of the claims of the present application. The articulated robot actuator 200 according to the present invention will be apparent from one of these embodiments.

Referring to FIGS. 3 to 5, the pair of worm gears 230a and 230b may be respectively included in a pair of worm gear covers 240a and 240b. The pair of worm gears 230a and 230b may be mounted on parallel rotary shafts of the motors 210a and 210b in the articulated robot actuator 200, and be respectively included in the worm gear covers 240a and 240b.

Here, the pair of motors 210a and 210b and the pair of worm gears 230a and 230b coupled to the pair of motors 210a and 210b may be provided on the same side surface with respect to the pair of joint actuating members 400a and 400b.

Components of the worm gear covers 240a and 240b and a connection therebetween will be described below.

The pair of worm gear covers 240a and 240b may include a pair of lateral members 241a and 241b provided on a side surface of a housing 300 including the pair of joint actuating members 400a and 400b therein, such that the pair of worm gears 230a and 230b are located in the pair of lateral members 241a and 241b. Thus, when the worm gears 230a and 230b are rotated by rotational actuation forces from the motors 210a and 210b, the worm gears 230a and 230b may be stably rotated since upper ends thereof may be rotatably fixed by inner upper ends of the lateral members 241a and 241b.

The worm wheel gears 250a and 250b of the pair of first gear parts 220a and 220b may be respectively included in a pair of worm wheel gear covers 260a and 260b. The pair of worm wheel gear covers 260a and 260b may be provided to place therein the pair of worm wheel gears 250a and 250b located on parallel rotary shafts perpendicular to the pair of worm gears 230a and 230b coupled to the pair of worm wheel gear covers 260a and 260b.

The pair of worm wheel gears 250a and 250b may be fixed on a side surface of the housing 300 to have a drive shaft perpendicular to the pair of worm gears 230a and 230b, and be rotated while being engaged with the pair of worm gears 230a and 230b. Pin holders 261a and 261b of the worm wheel gear covers 260a and 260b are provided at an outer side of the housing 300 such that the worm wheel gears 250a and 250b are located in the pin holders 261a and 261b. Thus, the worm wheel gears 250a and 250b may be protected from the outside.

Here, the pin holders 261a and 261b configured to place the worm wheel gears 250a and 250b therein and the lateral members 241a and 241b configured to place the worm gears 230a and 230b therein are hinge-coupled. Thus, the worm gears 230a and 230b and the worm wheel gears 250a and 250b may be selectively engaged with or disengaged from each other. The selective engagement of the worm gears 230a and 230b and the worm wheel gears 250a and 250b and the selective disengagement thereof will be described below.

For engagement of the worm gears 230a and 230b and the worm wheel gears 250a and 250b, at least one side surface of each of the worm gear covers 240a and 240b and the worm wheel gear covers 260a and 260b may be open to communicate the worm gear covers 240a and 240b and the worm wheel gear covers 260a and 260b with one another. For example, referring to FIG. 5, each of the worm gear covers 240a and 240b and the worm wheel gear covers 260a and 260b may have a ⊏-shaped structure in which a top surface, a bottom surface, and one side surface are coupled in a long-axis direction and three side surfaces among four side surfaces thereof are open. The worm gear covers 240a and 240b and the worm wheel gear covers 260a and 260b are coupled to one another such that they communicate with one another via one of the three open side surfaces of each of them. Accordingly, the worm gears 230a and 230b and the worm wheel gears 250a and 250b may be configured to be engaged with one another.

The worm gear covers 240a and 240b may be hinge-coupled to the worm wheel gear covers 260a and 260b. More specifically, the worm gear covers 240a and 240b may be hinge-coupled to the worm wheel gear covers 260a and 260b coupled to an outer side surface of the housing 300. To this end, upper and lower ends of the worm gear covers 240a and 240b and the worm wheel gear covers 260a and 260b may be hinge-coupled by being fixed by a hinge pin 262 while the upper and lower ends thereof overlap.

In this case, since the articulated robot actuator 200 includes the pair of worm gears 230a and 230b and the pair of worm wheel gears 250a and 250b, open opposite surfaces of the pair of worm wheel gear covers 260a and 260b located on the same drive shaft to be spaced a predetermined distance from each other, and another open surface of each of the pair of worm wheel gear covers 260a and 260b fixed at the outer side of the housing 300 may be blocked from external access to the actuator 200. The remaining open surface of each of the pair of worm wheel gear covers 260a and 260b is located inside of the worm gear covers 240a and 240b and thus the worm gears 230a and 230b may be engaged with the worm wheel gears 250a and 250b. Accordingly, the inside of the pair of worm wheel gear covers 260a and 260b may be protected from the outside.

Furthermore, the worm gear covers 240a and 240b include worm gear protecting members 242a and 242b located on surfaces thereof opposite to surfaces of the worm gear covers 240a and 240b communicating with the worm wheel gear covers 260a and 260b so as to protect the worm gears 230a and 230b from the outside.

The pair of spring members 270a and 270b may respectively include connecting shafts 275a and 275b configured to be inserted into inner circumferential surfaces thereof so that the pair of spring members 270a and 270b may be stably located at the same drive shaft line as the pair of worm wheel gears 250a and 250b and the pair of spur gears 290a and 290b.

The pair of connecting shafts 275a and 275b are respectively inserted into the inner circumferential surfaces of the pair of spring members 270a and 270b coupled to the pair of worm wheel gears 250a and 250b. The pair of spring members 270a and 270b may be respectively coupled to the spur gears 290a and 290b via the connecting shafts 290a and 290b. However, the connecting shafts 290a and 290b are not indispensable components of the articulated robot actuator 200 according to an embodiment of the present invention and may be thus omitted.

Although the spring members 270a and 270b may be torsionally deformed during transfer of rotational actuation forces from the motors 210a and 210b, the articulated robot actuator 200 may compensate for torque caused by the torsional deformation of the spring members 270a and 270b by canceling the torsional deformation of the spring members 270a and 270b by measuring a degree of torsion strain of the spring members 270a and 270b and controlling the motors 210a and 210b according to the degree of torsion strain.

Here, the pair of joint actuating members 400a and 400b may include encoders 415a and 415b on drive shafts thereof to measure rotation angles of the pair of joint actuating members 400a and 400b and measure the degree of torsion strain of the pair of spring members 270a and 270b on the basis of the rotation angles of the pair of joint actuating members 400a and 400b.

In the related art, sensors such as the encoders 415a and 415b should be attached to the joints hj and kj to measure the rotation angles of the joints hj and kj. In contrast, in the present invention, the encoders 415a and 415b are respectively provided on the drive shafts of the pair of joint actuating members 400a and 400b and thus the rotation angles of the joints hj and kj of each of a user's two legs may be measured. Thus, the number and size of machine parts required may be reduced and the structures of the joints hj and kj may be simplified, thereby improving system management.

The hardness of the spring members 270a and 270b may be considered before selected as components of the actuator 200. When the hardness of the spring members 270a and 270b is high, the degree of torsion strain thereof decreases and thus rotational actuation forces from the motors 210a and 210b may be easily transferred to an output side but outputting of the rotational actuation forces cannot be flexibly controlled using the actuator 200. When the hardness of the spring members 270a and 270b is low, a rotational actuation force to be output from the actuator 200 may be low. Accordingly, the spring members 270a and 270b may be selected as having appropriate hardness.

The pair of second gear parts may respectively include the spur gears 290a and 290b. A plurality of spur gears 290a and 290b may be provided according to the locations and sizes of the pair of spring members 270a and 270b and the pair of joint actuating members 400a and 400b or to reduce the speed of rotational actuation forces and to amplify power.

Although it is illustrated that each of the second gear parts of the articulated robot actuator 200 of FIGS. 4A and 4B includes one of the spur gears 290a and 290b, embodiments are not limited thereto and a plurality of spur gears 290a and 290b may be provided to be engaged with each other. Here, similarly, when the second gear parts include a plurality of spur gears 290a and 290b, rotary shafts of the plurality of spur gears 290a and 290b are preferably located in parallel with those of the pair of joint actuating members 400a and 400b for an efficient of path of movement of a rotational actuation force from the articulated robot actuator 200.

As described above, if the above-described locations of the rotary shafts, i.e., a condition of rotary-shaft directions with respect to the motors 210a and 210b and the joint actuating members 400a and 400b, are satisfied, a plurality of gears of the articulated robot actuator 200, i.e., gears of the first gear parts 220a and 220b and the second gear parts, may be further provided according to the usage of the leg-supporting robot 10 to which the articulated robot actuator 200 is applied and a desired rotational actuation force. A connection between the gears may be also designed in a selective combination of various structures in which the gears are connected in a line on vertical drive shafts and the same drive shaft.

The pair of second gear parts may receive rotational actuation forces and actuate the joints hj and kj to be actuated, according to the degree of torsion strain of the pair of spring members 270a and 270b.

The joints hj and kj to be actuated are provided to correspond to a user's joints and serve as the joints when the user wears the leg-supporting robot 10 having mounted thereon the articulated robot actuator 200, and may be actuated by the rotation of the pair of joint actuating members 400a and 400b engaged with the pair of second gear parts.

Here, one or both the joints hj and kj to be actuated may be provided in consideration of a structure of a body of the user who wears the leg-supporting robot 10, matters of the body's movement to be compensated for, etc. When both the joints hj and kj are provided, they may be coupled to each other on locations spaced apart from each other via the link members 11 and 12.

The joints hj and kj to be actuated may include a first joint hj directly coupled to the pair of joint actuating members 400a and 400b, and a second joint kj spaced apart from the first joint hj and coupled to the pair of joint actuating members 400a and 400b via the link members 11 and 12.

The leg-supporting robot 10 will be described with reference to FIG. 2 below. The first joint hj may be provided to support a hip joint of the user who wears the leg-supporting robot 10, and the second joint kj may be provided to support the user's knee joint.

Thus, the user who wears the leg-supporting robot 10 may be able to walk while receiving a support for the hip joint and the knee joint from the first joint hj and the second joint kj rotatably actuated by an actuation force from the articulated robot actuator 200.

The first joint hj may be understood to mean a drive shaft of the pair of joint actuating members 400a and 400b.

The first joint hj and the second joint kj are configured to support stretching and bending of the hip joint and the knee joint, when applied to the leg-supporting robot 10 having mounted thereon the articulated robot actuator 200. Referring to FIGS. 1, 2, 4A and 4B, the drive shaft of the joint actuating members 400a and 400b may be preferably located at the hip joint of the user who wears the leg-supporting robot 10. Thus, in the leg-supporting robot 10, the first joint hj may be understood as being placed on the location of the drive shaft of the pair of joint actuating members 400a and 400b. Accordingly, the drive shaft of the pair of joint actuating members 400a and 400b may be the first joint hj.

The pair of joint actuating members 400a and 400b may be stacked together and share the same drive shaft. The drive shaft of the pair of joint actuating members 400a and 400b may be parallel to parallel drive shafts of the pair of second gear parts. Thus, the joint actuating members 400a and 400b may be rotated while being engaged with the pair of spur gears 290a and 290b of the pair of second gear parts.

A connection between the joint actuating members 400a and 400b and the second gear parts will be described in more detail below. The joint actuating member 400a of the pair of joint actuating members 400a and 400b may be coupled to the second gear part 290a of the pair of second gear parts to be engaged with the second gear part 290a, and the other joint actuating member 400b may be coupled to the other second gear part 290b to be engaged with the second gear part 290b.

Thus, the pair of joint actuating members 400a and 400b are respectively coupled to the second gear parts, and may be thus individually receive actuation forces from the motors 210a and 210b which rotate the second gear parts coupled to the pair of joint actuating members 400a and 400b and be rotatably actuated on locations on which the pair of joint actuating members 400a and 400b are stacked with respect to the same drive shaft.

A degree of torsion strain of the spring members 270a and 270b according to at least one of the pair of joint actuating members 400a and 400b may be canceled by the motors 210a and 210b.

In detail, the spring members 270a and 270b may be flexibly driven to correspond to the rotation of the joint actuating members 400a and 400b, separately from the rotation thereof by the motors 210a and 210b providing rotational actuation forces to the actuator 200.

That is, the joint actuating members 400a and 400b may be rotated separately from the rotation thereof by a rotational actuation force from the actuator 200, when a support member s supporting the user's body from the ground while being coupled to the second joint kj coupled to the joint actuating members 400a and 400b interacts with the ground, a wall, or an external object.

Here, when the support member s interacts with the outside and transfers an external force to the leg-supporting robot 10, the spring members 270a and 270b coupled to the second gear parts rotatably actuating the joint actuating members 400a and 400b may be torsionally deformed. That is, when the leg-supporting robot 10 interacts with the outside, the joint actuating members 400a and 400b may be rotated. Thus, the actuator 200 may restore the spring members 270a and 270b by rotating the motors 210a and 210b to compensate for the torsional deformation of the spring members 270a and 270b, caused by the deformation of the joint actuating members 400a and 400b.

Thus, the actuator 200 is actuated to correspond to additional rotation by the joint actuating members 400a and 400b while rotating the joint actuating members 400a and 400b by providing a rotational actuation force thereto. Therefore, the joint actuating members 400a and 400b may be more flexibly rotatably actuated.

As described above, the actuator 200 employs the spring members 270a and 270b. Thus, a frictional force corresponding to a rotational output which may be generated in the actuator 200 may be reduced, and a rotation occurring at an output side caused by an interaction with the outside may be flexibly handled.

However, in some cases, the joint actuating members 400a and 400b coupled to the actuator 200 should arbitrarily interact with the outside. That is, a user of the leg-supporting robot 10 may want to move his or her joint regardless of a rotational actuation force while moving by receiving a rotational actuation force from the actuator 200.

For example, the user of the leg-supporting robot 10 may lessen a pain occurring at his or her joint when walking or may sit on a chair or the ground.

In this case, as described above, the actuator 200 may compensate for torsional deflection of the spring members 270a and 270b according to the user's intention and thus the user may walk as he or she wants. However, the motors 210a and 210b applying rotational driving forces to the actuator 200 should be operated even in this case. Thus, the motors 210a and 210b should be always operated. When a rechargeable battery is used, power cannot be efficiently used.

Accordingly, an operating state of an actuator capable of more flexibly handling an interaction with the outside through selective disengagement of gears if necessary will be described below.

Figure 6:
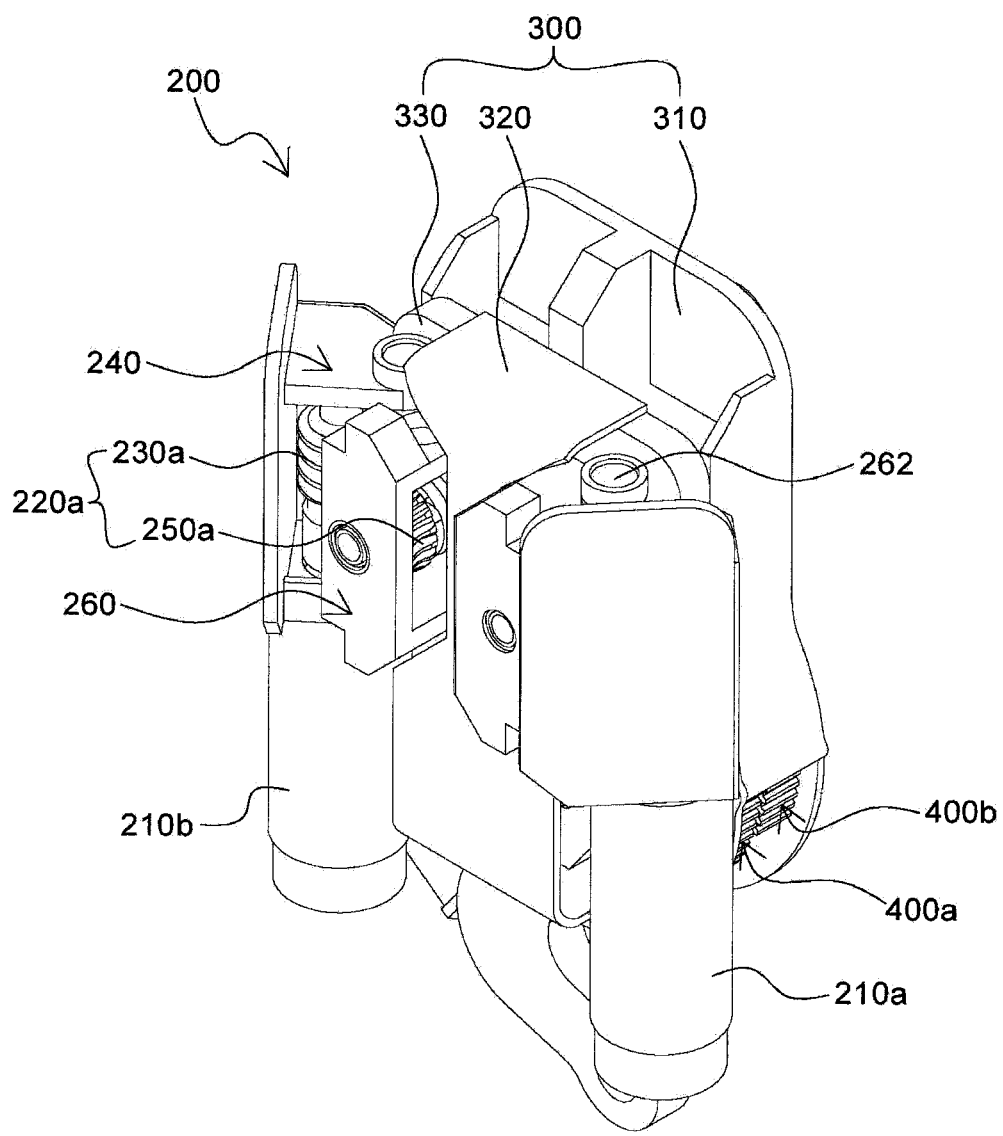
FIG. 6 illustrates a disengaged state of first gear parts of an articulated robot actuator according to an embodiment of the present invention.
Figure 7A:
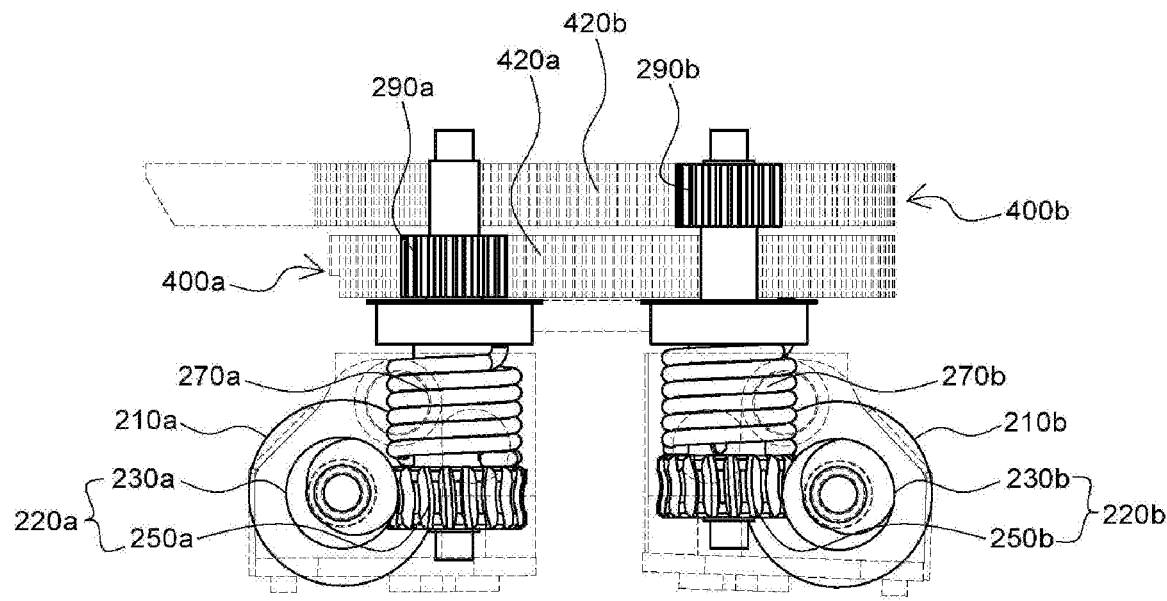
FIG. 7A and FIG. 7B are top view illustrating an engaged state and a disengaged state of a first gear parts of an articulated robot actuator, respectively, according to an embodiment of the present invention.
Figure 7B:
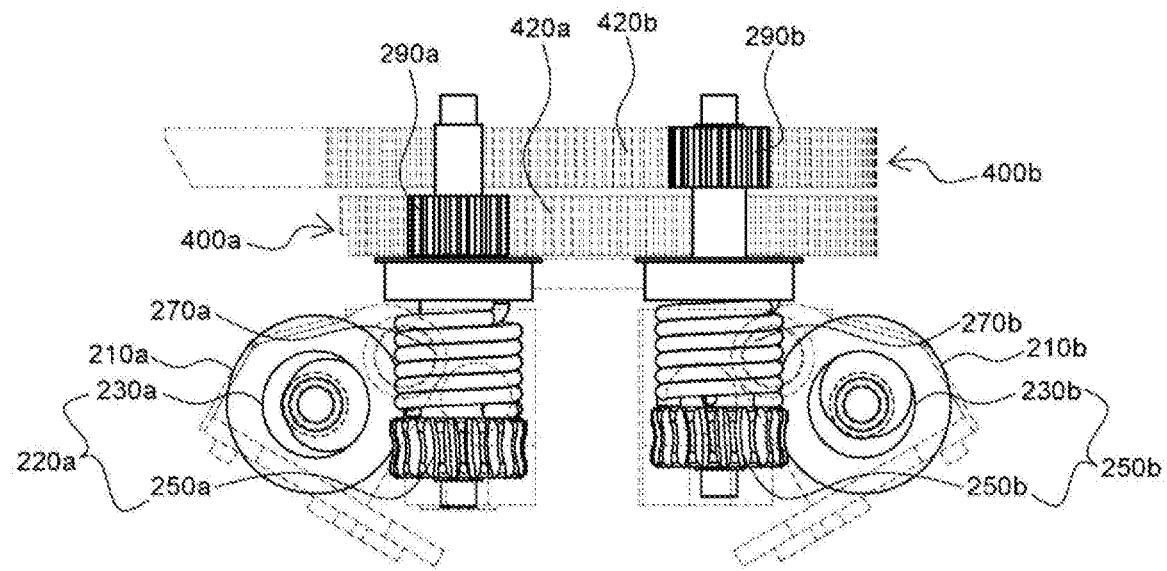

FIG. 6 illustrates an engaged state and a disengaged state of first gear parts of an articulated robot actuator according to an embodiment of the present invention. FIG. 7A and FIG. 7B are top views illustrating an engaged state and a disengaged state of a first gear part of an articulated robot actuator, respectively, according to an embodiment of the present invention.

In the articulated robot actuator 200 according to an embodiment of the present invention, the pair of motors 210a and 210b and the worm gears 230a and 230b of the pair of first gear parts 220a and 220b may be hinge-coupled to the housing 300 of the actuator 200. Thus, the worm gears 230a and 230b of the pair of first gear parts 220a and 220b may be configured to be rotatable about a location on the housing 300 to which they are hinge-coupled, such that the worm gears 230a and 230b are rotated toward the pair of worm wheel gears 250a and 250b to be engaged with the pair of worm wheel gears 250a and 250b or are rotated away from the pair of worm wheel gears 250a and 250b to be disengaged from the pair of worm wheel gears 250a and 250b.

Although FIGS. 6, 7A and 7B illustrate that a pair of worm gear cases 240a and 240b are hinge-coupled to a pair of worm wheel gear cases 260a and 260b fixed on the housing 300 to be rotatable about the pair of worm wheel gear cases 260a and 260b, the pair of worm wheel gear cases 260a and 260b protect some components of the articulated robot actuator 200 from the outside, similar to the housing 300, and are fixed on the housing 300. Thus, the pair of worm wheel gear cases 260a and 260b may be understood to be included in the housing 300.

In detail, the actuator 200 may be fixed by being attached to a side surface of the housing 300. In this case, the worm wheel gear cases 260a and 260b are provided to protrude from a side surface of the housing 300. Thus, the worm wheel gears 250a and 250b may be also provided on projecting portions of the housing 300. Here, the spring members 270a and 270b coupled to the worm wheel gears 250a and 250b on the projecting portions of the housing 300, and the spur gears 290a and 290b of the second gear parts coupled to the spring members 270a and 270b may be provided toward the inside of the housing 300 from the worm wheel gears 250a and 250b located outside a side surface of the housing 300.

Furthermore, the pair of motors 210a and 210b, and the worm gears 230a and 230b of the first gear parts 220a and 220b mounted on the rotary shafts of the pair of motors 210a and 210b may be included in the worm gear cases 240a and 240b. The worm gear cases 240a and 240b may be provided on a side surface of the housing 300.

Here, the worm gear cases 240a and 240b may be fixed by being hinge-coupled to the worm wheel gear cases 260a and 260b through the hinge pin 262 described above, and may be closely adhered to the worm wheel gear cases 260a and 260b including therein the worm wheel gears 250a and 250b of the first gear parts 220a and 220b located on an outer side surface of the housing 300 may be provided.

Thus, due to the worm gear cases 240a and 240b and the worm wheel gear cases 260a and 260b which are closely adhered to each other, the worm gears 230a and 230b included I the worm gear cases 240a and 240b and the worm wheel gears 250a and 250b included in the worm wheel gear cases 260a and 260b may be engaged with each other.

The worm gear cases 240a and 240b are hinge-coupled to the worm wheel gear cases 260a and 260b, which are fixed on the housing 300, via the hinge pin 262, and may thus be rotated about locations on the worm wheel gear cases 260a and 260b to which they are hinge-coupled. In this case, the worm gear cases 240a and 240b may be rotated toward or away from the worm wheel gear cases 260a and 260b.

That is, the worm gear cases 240a and 240b may be rotated about the locations on the worm wheel gear cases 260a and 260b to which they are hinge-coupled, such that the worm gears 230a and 230b of the first gear parts 220a and 220b are rotated toward the worm wheel gears 250a and 250b of the first gear parts 220a and 220b to be engaged with the worm wheel gears 250a and 250b or are away from the worm wheel gears 250a and 250b to be disengaged with the worm wheel gears 250a and 250b.

Referring to FIGS. 6 and 7B, the worm gears 230a and 230b are rotated toward the worm wheel gears 250a and 250b to be engaged with the worm wheel gears 250a and 250b. Referring to FIG. 6, the worm gears 230a and 230b are rotated away from the worm wheel gears 250a and 250b to be disengaged from the worm wheel gears 250a and 250b.

Here, a magnetic structure (not shown) may be employed in the housing 300 to stably support the engagement of the worm gears 230a and 230b and the worm wheel gears 250a and 250b of the first gear parts 220a and 220b, so that the worm gears 230a and 230b and the worm wheel gears 250a and 250b of the first gear parts 220a and 220b may not be easily separated from each other.

As described above, in the articulated robot actuator 200 according to an embodiment of the present invention, an engagement state between the first gear parts 220a and 220b may be selectively determined. Thus, when rotational actuation forces from the motors 210a and 210b are not needed or battery power needs to be saved, the first gear parts 220a and 220b may be selectively disengaged from each other. Accordingly, use of the motors 210a and 210b may be selectively controlled to reduce power consumption.

That is, the disengaging of the worm gears 230a and 230b and the worm wheel gears 250a and 250b from each other may be understood to completely disconnecting an actuation-force movement path. Thus, a degree of torsion strain of the spring members 270a and 270b may be fundamentally removed by removing mechanical friction that a user may feel rather than controlling the mechanical friction.

Furthermore, during use of the actuator 200, a rotational actuation force from which mechanical friction is reduced may be flexibly output through the spring members 270a and 270b. When rotational actuation forces from the motors 210a and 210b are not needed or an arbitrary interaction with the outside is needed, the first gear parts 220a and 220b may be disengaged from each other and thus the actuator 200 may be more flexibly used.

By mounting the articulated robot actuator 200 according to the present invention on the leg-supporting robot 10, the movement of a hip joint and a knee joint of a user who wears the leg-supporting robot 10 may be facilitated. Therefore, a user with impaired mobility may walk similar to normal people's walking as possible as he or she can.

Accordingly, a relation between operations of joints of the articulated robot actuator 200 mounted on the leg-supporting robot 10 will be described below.

In one embodiment of the present invention, in order to actuate a plurality of joints of leg-supporting robot 10 through independent rotation of the pair of joint actuating members 400a and 400b, a connection between the pair of joint actuating members 400a and 400b and each of the joints may be important. That is, a robot such as the leg-supporting robot 10 which supports a user's walking by stretching or bending each joint of the user's legs in a forward or backward direction should be capable of rotating the joint actuating members 400a and 400b to control the rotation of each joint in the forward or backward direction.

Accordingly, in the articulated robot actuator 10 according to an embodiment of the present invention, the pair of joint actuating members 400a and 400b may be respectively coupled to a front part and a rear part of the second joint kj via the pair of link members 11 and 12. Thus, the pair of joint actuating members 400a and 400b may transfer a turning force via the front part and/or the rear part of the second joint kj, and the second joint kj may be thus rotated forward or backward through control of the rotation thereof by the pair of joint actuating members 400a and 400b. Here, the second joint kj may be in the form of a round gear or may be hinge-coupled to the link members 11 and 12 and the support member s, but is not limited thereto and may have any structure capable of stretching or bending a knee joint part of a human leg.

In detail, a first link member 11 coupled to the first joint actuating member 400a of the pair of joint actuating members 400a and 400b via a first connecting member 410a may be coupled to the rear part of the second joint kj, and a second link member 12 coupled to the second joint actuating member 400b via a second connecting member 410b may be coupled to the front part of the second joint kj. That is, the pair of joint actuating members 400a and 400b may respectively include the first and second connecting members 410a and 410b, and may be coupled to the second joint kj via the link members 11 and 12.

As described above, according to an embodiment of the present invention, the articulated robot actuator 10 according to the present invention may include the first joint hj which may correspond to the drive shaft of the pair of joint actuating members 400a and 400b, and the second joint kj spaced apart from the first joint hj and coupled to the pair of joint actuating members 400a and 400b via the pair of link members 11 and 12. The movement of a hip joint and a knee joint of a user who wears the leg-supporting robot 10 may be supported through the first joint hj and the second joint kj.

Here, the second joint kj may be rotatably actuated through rotational actuation of the pair of joint actuating members 400a and 400b. That is, the second joint kj may be rotatably actuated through the rotational actuation of one of the first joint actuating member 400a and the second joint actuating member 400b.

In detail, referring to FIGS. 1 and 2, the first connecting member 410a of the first joint actuating member 400a may be coupled to the rear part of the second joint kj via the first link member 11, and the second connecting member 410b of the second joint actuating member 400b may be coupled to the second joint kj via the second link member 12. Thus, the first connecting member 410a and the second joint kj may have different rotational characteristics according to different rotations of the first joint actuating member 400a and the second joint actuating member 400b.

That is, the rotational characteristics of the second joint kj may vary according to whether the pair of first joint actuating member 400a and second joint actuating member 400b are simultaneously rotated in the same direction or different directions. Furthermore, the rotational characteristics of the second joint kj may vary according to whether the pair of first joint actuating member 400a and second joint actuating member 400b are simultaneously rotated or whether only one of them is rotated. Here, an angle of rotation of each of the pair of first joint actuating member 400a and second joint actuating member 400b may be also a very important factor influencing the rotational characteristics of the second joint kj. The above description may also apply to the rotational characteristics of the first joint hj.

The first joint actuating member 400a and the second joint actuating member 400b may be rotated in the same direction or different directions or only one of them may be rotated according to a gait cycle of a user who wears the leg-supporting robot 10.

FIG. 2 may be referred to in relation to the user's gait cycle. Rotational characteristics of each joint of a user according to the user's gait cycle will be described with respect to a right leg of both legs of the user which is indicated in black in the diagrams of FIG. 2(a) to (d) below.

Referring to FIG. 2, the user's gait cycle may be largely divided into stance phases (a) to (c) in which the user's foot is in contact with the ground, and a swing phase (d) in which the user's foot is not in contact with the ground. When walking, each of the stance phases and the swing phase is sub-divided such that the user may walk by individually moving a hip joint and a knee joint according to a situation.

Thus, the first joint hj and the second joint kj need to be appropriately rotatably actuated by the articulated robot actuator 10 such that a user who wears the leg-supporting robot 10 may walk in each gait cycle, similar to normal people's walking.

The first joint hj and the second joint kj may be controlled aiming at normal people's walking by individually controlling the rotation of the first joint actuating member 400a and the second joint actuating member 400b.

In detail, when the first joint actuating member 400a and the second joint actuating member 400b are rotated together, the first joint hj and the second joint kj may be rotated in the same direction or different directions or the rotation of one of them may be stopped.

For example, when a user who wears the leg-supporting robot 10 starts contacting his or her foot with the ground by stretching out his or her leg in the forward direction during walking, a first joint hj and a second joint kj of the leg moving forward may be actuated to be rotated in the same direction, i.e., the forward direction. To this end, the first joint hj should be bent with respect to the user's body, and the second joint kj should be stretched out.

Thus, the second joint actuating member 400b may be rotated forward to rotate the first joint hj in the forward direction. That is, the second joint actuating member 400b may be actuated to bend the first joint hj in the forward direction with respect to the user's body. The first joint actuating member 400a may be rotated forward by an angle greater than an angle of rotation of the second joint actuating member 400b in the forward direction, thereby contributing to the forward rotation of the first joint hj. Furthermore, the second joint kj may be rotated forward to a large degree using the rear part of the second joint kj, thereby stretching out the second joint kj.

Changes may be made in the above-described embodiment according to the structures of the first joint actuating member 400a and the second joint actuating member 400b and a relation and connection between the pair of joint actuating members 400a and 400b and the joints hj and kj. For better understanding of the present invention, exemplary embodiments will be described herein with reference to the drawings of the present application. However, it should be understood that the present invention can be implemented in various embodiments although not shown in the drawings.

When the pair of joint actuating members 400a and 400b are rotated together, one of the first joint hj and the second joint kj may be fixed to prevent the rotation thereof and the other may be rotatably actuated. To this end, an angle of rotation of the first joint actuating member 400a configured to be rotated in the same direction as the second joint actuating member 400b may be controlled using the front part of the second joint kj according to an angle of rotation of the second joint actuating member 400b contributing to the rotation of the second joint kj, as described above.

In detail, if the second joint actuating member 400b is rotated in the same direction and at same angle while being rotated forward, both the second joint actuating member 400b and the first joint actuating member 400a are aiming to move the second joint kj forward by the same distance. Thus, only the first joint hj is rotated forward while the second joint kj is fixed, i.e., the location of the second joint kj may be changed according to the rotation of the first joint hj without rotating the second joint kj.

On the contrary to the previous embodiment, when only one of the pair of joint actuating members 400a and 400b is rotated, i.e., when only one of the first joint actuating member 400a and the second joint actuating member 400b is rotated, one of the first joint hj and the second joint kj may be fixed and only the other may be rotatably actuated or the first joint hj and the second joint kj may be rotatably actuated in the same direction or different directions.

In detail, when the second joint actuating member 400b is rotated by a very large angle while the first joint actuating member 400a is fixed, the second link member 12 coupled to the second joint actuating member 400b is rotated forward with respect to the drive shaft of the pair of the first and second joint actuating members 400a and 400b and thus the first joint hj is bent. Since the first joint actuating member 400a is fixed, the rotation of the first joint hj is not directly influenced by the first joint actuating member 400a. However, the first link member 11 coupled to the first joint actuating member 400a is coupled to the second joint kj to which the second link member 12 is coupled, the second joint kj is moved upward and forward due to the rotation of the second link member 12. Accordingly, the second joint kj is influenced by the first link member 11 and is thus bent backward.

As another example, the second joint kj may be bent backward while the first joint hj is fixed when the first joint actuating member 400a is rotated by a small angle while the second joint actuating member 400b is fixed, i.e., when the first link member 11 coupled to the first joint actuating member 400a is rotated backward by a small angle not to exert an influence on the first joint actuating member 400b coupled to the second link member 12 coupled to the second joint kj to which the first link member 11 is coupled.

While a method of controlling the movement of each joint of a user who wears the leg-supporting robot 10 according to the user's gait cycle by controlling rotational characteristics of the first joint actuating member 400a and the second joint actuating member 400b has been described above, a leg of the user of the leg-supporting robot 10 may be fixed to support the user's body on the ground by rotating the first joint actuating member 400a and the second joint actuating member 400b to stretch out each of the first joint hj and the second joint kj or by fixing the first joint actuating member 400a and the second joint actuating member 400b.

As described above, various changes may be made in the above-described embodiments according to the structures of the first joint actuating member 400a and the second joint actuating member 400b and a relation and connection between the pair of joint actuating members 400a and 400b and the joints hj and kj. Thus, it should be understood that the present invention may be implemented in various embodiments.

As described above, the articulated robot actuator 200 according to present invention is capable of, when mounted on the leg-supporting robot 10, supporting the walking of a user who wears the leg-supporting robot 10 such that the user may be able to appropriately walk at a stance phase in which the user's foot is in contact with the ground and a swing phase in which the user's joint is rotated with user's foot not in contact with the ground. To this end, the rotational characteristics of the joint actuating members 400a and 400b may be controlled according to various embodiments, for example, by rotating the first joint hj and the second joint kj in the same direction or different directions or rotating only one of them.

With use of one articulated robot actuator 200 according to the present invention, a plurality of joints may be actuated and thus the volume and weight of the leg-supporting robot 10 having mounted thereon the articulated robot actuator 200 may be minimized and power consumption thereof may be also saved.

Furthermore, a joint structure and a skeleton structure of the leg-supporting robot 10 having mounted thereon the articulated robot actuator 200 are designed to be substantially the same as those of a human body, and thus a user with impaired mobility may use the leg-supporting robot 10 to more naturally move.

While the technical idea of the present invention has been described with respect to examples thereof, various changes and modifications may be made in the present invention without departing from essential features of the present invention by those of ordinary skill in the technical field to which the present invention pertains. The embodiments of the present invention set forth herein are not intended to restrict the technical idea of the present invention and are only used to describe it. The scope of the present invention is not limited by these embodiments. Therefore, the scope of the invention should be defined by the appended claims, and all differences within the scope will be construed as being included in the present invention.

The invention claimed is:

1. An articulated robot actuator comprising:
   a pair of motors of which rotary shafts are arranged in parallel with each other;
   a pair of first gear parts configured to change directions of rotational actuation forces provided by the pair of motors;
   a pair of spring members of which degrees of torsion strains are determined by the rotational actuation forces transferred from the pair of first gear parts;
   a pair of second gear parts to which the rotational actuation forces are transferred according to the degrees of the torsion strains of the pair of spring members; and
   a pair of joint actuating members configured to be rotated about a common rotary shaft by the rotational actuation forces transferred from the pair of second gear parts, and rotatably actuate a plurality of joints of an articulated robot,
   wherein the plurality of joints include a first joint and a second joint spaced apart from the first joint,
   wherein the pair of joint actuating members are coupled directly to the first joint, both of the joint actuating members being configured to actuate the first joint,
   wherein the pair of joint actuating members are coupled to the second joint via a pair of link members,
   wherein the pair of link members include first and second link members connected to the pair of joint actuating members, respectively, both of the first and second link members being directly connected to the second joint to directly actuate the second joint by the pair of joint actuating members,
   wherein the first link member is connected to a front portion of the second joint, and the second link member is connected to a rear portion of the second joint,
   wherein each of the pair of first gear parts comprises:
      a worm gear having a drive shaft aligned with the rotary shaft of one of the pair of motors;
      a worm wheel gear engaged with the worm gear, the worm wheel gear having a drive shaft perpendicular to the drive shaft of the worm gear;
      a worm wheel gear cover configured to accommodate the worm wheel gear therein, the worm wheel gear cover being fixed to a housing of the articulated robot actuator; and
      a worm gear cover configured to accommodate the worm gear therein and hold one of the pair of motors to be coupled to the worm gear, the worm gear cover being configured to have a hinge-coupling with the worm wheel gear cover and to pivot about a hinge axis perpendicular to the drive shaft of the worm wheel gear to allow the worm gear to selectively engage with the worm wheel gear.

2. The articulated robot actuator of claim 1, wherein the second joint is rotatably actuated by rotational actuation of at least one of the pair of joint actuating members.

3. The articulated robot actuator of claim 1, wherein the pair of second gear parts comprises spur gears, respectively, the spur gears being configured to be independently rotatably actuated about a pair of parallel rotary shafts thereof, respectively, and
   the pair of joint actuating members comprises stacked rotary plates, the stacked rotary plates being independently rotatably actuated by the spur gears about the common rotary shaft which is parallel to the rotary shafts of the spur gears.

4. The articulated robot actuator of claim 3, wherein the spur gears of the pair of second gear parts are mounted on different positions on the pair of parallel rotary shafts to transfer the rotational actuation forces to the pair of joint actuating members.

5. The articulated robot actuator of claim 1, wherein the pair of motors are configured to counteract degrees of torsion strains of the spring members caused by the pair of joint actuating members which are rotated by an external force other than the rotational actuation forces from the pair of motors.

6. The articulated robot actuator of claim 1, wherein the articulated robot is a leg-supporting robot configured to be attachable to and detachable from a user's body to support the user's walking,
   the first joint is provided to support the user's hip joint, and
   the second joint is provided to support the user's knee joint.

7. The articulated robot actuator of claim 6, wherein the pair of joint actuating members are rotated in the same direction or different directions or only one of the pair of joint actuating members is rotated according to the user's gait cycle.

8. The articulated robot actuator of claim 7, wherein, when the pair of joint actuating members are rotated together, the first joint and the second joint are rotatably actuated in the same direction or different directions or a rotation of one of the first and second joints is stopped.

9. The articulated robot actuator of claim 8, wherein in a stance phase and in a swing phase of the user's gait cycle, the joint actuating members are rotatably actuated to rotate the first and second joints of the user's leg in the same direction or different directions or to rotate only one of the first and second joints.

10. The articulated robot actuator of claim 1, wherein the first joint comprises the common rotary shaft of the pair of joint actuating members.

11. The articulated robot actuator of claim 1, wherein the worm gear is pivoted toward the worm wheel gear cover about the hinge axis by the worm gear cover to engage with the worm wheel gear, and wherein the worm gear is pivoted away from the worm wheel gear cover about the hinge axis by the worm gear cover to disengage from the worm wheel gear.

12. The articulated robot actuator of claim 1, wherein the housing of the articulated robot actuator includes a magnetic structure configured to maintain engagement of the worm gear and the worm wheel gear.

13. The articulated robot actuator of claim 5, wherein the pair of joint actuating members includes encoders, respectively, the encoders being installed on the common rotary shaft of the pair of joint actuating members and measuring the degrees of the torsion strains of the spring members caused by the pair of joint actuating members which are rotated by the external force other than the rotational actuation forces of the pair of motors.

* * * * *